US010689473B2

(12) United States Patent
Jang et al.

(10) Patent No.: US 10,689,473 B2
(45) Date of Patent: Jun. 23, 2020

(54) GRAFT COPOLYMER, METHOD OF PREPARING GRAFT COPOLYMER, THERMOPLASTIC RESIN COMPOSITION INCLUDING GRAFT COPOLYMER, AND MOLDED PART INCLUDING THERMOPLASTIC RESIN COMPOSITION

(71) Applicant: LG CHEM, LTD., Seoul (KR)

(72) Inventors: Seok Goo Jang, Daejeon (KR); Jeong Su Choi, Daejeon (KR); Won Seok Lee, Daejeon (KR); Roo Da Lee, Daejeon (KR); Sang Hoo Park, Daejeon (KR); Hye Jeong Ok, Daejeon (KR); Ho Hoon Kim, Daejeon (KR); Hyung Seop Shim, Daejeon (KR); Keun Hoon Yoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 75 days.

(21) Appl. No.: 16/083,857

(22) PCT Filed: Jan. 2, 2018

(86) PCT No.: PCT/KR2018/000057
§ 371 (c)(1),
(2) Date: Sep. 10, 2018

(87) PCT Pub. No.: WO2018/139775
PCT Pub. Date: Aug. 2, 2018

(65) Prior Publication Data
US 2019/0062484 A1 Feb. 28, 2019

(30) Foreign Application Priority Data

Jan. 24, 2017 (KR) .................. 10-2017-0010785

(51) Int. Cl.
| | | |
|---|---|---|
| *C08L 25/12* | (2006.01) | |
| *C08F 279/02* | (2006.01) | |
| *C08F 220/14* | (2006.01) | |
| *C08F 222/34* | (2006.01) | |
| *C08F 212/04* | (2006.01) | |
| *C08F 2/24* | (2006.01) | |
| *C08F 2/38* | (2006.01) | |
| *C08F 2/44* | (2006.01) | |
| *C08F 2/26* | (2006.01) | |
| *C08L 33/12* | (2006.01) | |
| *C08L 55/02* | (2006.01) | |

(52) U.S. Cl.
CPC .............. *C08F 279/02* (2013.01); *C08F 2/24* (2013.01); *C08F 2/26* (2013.01); *C08F 2/38* (2013.01); *C08F 2/44* (2013.01); *C08F 212/04* (2013.01); *C08F 220/14* (2013.01); *C08F 222/34* (2013.01); *C08L 25/12* (2013.01); *C08L 33/12* (2013.01); *C08F 2500/24* (2013.01); *C08F 2800/20* (2013.01); *C08L 55/02* (2013.01); *C08L 2207/53* (2013.01)

(58) Field of Classification Search
CPC .. C08F 279/02; C08F 2/24; C08F 2/26; C08F 2/38; C08F 2/44; C08F 212/04; C08F 220/14; C08L 25/12; C08L 33/12; C08L 33/064; C08J 3/07
USPC ........................................................ 523/201
See application file for complete search history.

(56) References Cited

U.S. PATENT DOCUMENTS

| | | | |
|---|---|---|---|
| 10,066,041 B2 * | 9/2018 | Ahn | .................. C08L 9/08 |
| 2017/0190824 A1 | 7/2017 | Ahn et al. | |
| 2019/0330463 A1 * | 10/2019 | Shim | ...................... C08L 33/08 |
| 2019/0382575 A1 * | 12/2019 | Park | .......................... C08F 8/30 |

FOREIGN PATENT DOCUMENTS

| | | |
|---|---|---|
| CN | 105658725 A | 6/2016 |
| KR | 10-0564816 B1 | 3/2006 |
| KR | 10-0769249 B1 | 10/2007 |
| KR | 10-2014-0082134 A | 7/2014 |
| KR | 10-2014-0124577 A | 10/2014 |
| KR | 10-2016-0059956 A | 5/2016 |
| KR | 10-2016-0084733 A | 7/2016 |
| KR | 10-2016-0147528 A | 12/2016 |
| WO | 2016204485 | 12/2016 |
| WO | WO2016204485 A1 | 12/2016 |

OTHER PUBLICATIONS

International Search Report for International Patent Application No. PCT/KR2018/000057, dated Apr. 6, 2018.
Search Report dated Mar. 21, 2019 for European Application No. 18744366.8.
Notification of 1st OA dated Apr. 3, 2020 for CN 201880001247.1, Apr. 3, 2020.

* cited by examiner

*Primary Examiner* — Hannah J Pak

(57) ABSTRACT

The present invention relates to a graft copolymer having excellent thermal stability, a method of preparing the graft copolymer, a thermoplastic resin composition including the graft copolymer, and a molded part including the thermoplastic resin composition. According to the present invention, since the thermoplastic resin composition of the present invention includes the graft copolymer having excellent thermal stability, the thermoplastic resin composition and the molded part manufactured using the thermoplastic resin composition have excellent physical properties, such as impact strength, fluidity, and transparency. Furthermore, the degree of discoloration that may occur when the resin composition or the molded part is allowed to stay in an injection molding machine or stay at a high temperature for a long period of time may be reduced.

17 Claims, No Drawings

GRAFT COPOLYMER, METHOD OF PREPARING GRAFT COPOLYMER, THERMOPLASTIC RESIN COMPOSITION INCLUDING GRAFT COPOLYMER, AND MOLDED PART INCLUDING THERMOPLASTIC RESIN COMPOSITION

TECHNICAL FIELD

Cross-Reference to Related Application

This application is a U.S. National Stage of International Patent Application No. PCT/KR2018/000057 filed Jan. 2, 2018, which claims priority to Korean Patent Application No. 10-2017-0010785, filed on Jan. 24, 2017 in the Korean Intellectual Property Office, the disclosures of which are incorporated herein by reference.

The present invention relates to a graft copolymer having excellent thermal stability, a method of preparing the graft copolymer, a thermoplastic resin composition including the graft copolymer, and a molded part including the thermoplastic resin composition. More specifically, the present invention provides a graft copolymer having excellent thermal stability and a method of preparing the same, wherein a metal salt of sorbic acid is added in a specific amount during polymerization to increase thermal stability of a prepared graft copolymer. In addition, the present invention provides a thermoplastic resin composition having excellent physical properties, such as impact strength, fluidity, and transparency, and having resistance to discoloration due to retention at high temperatures, by including the graft copolymer. In addition, the present invention provides a molded part including the thermoplastic resin composition.

Background Art

Acrylonitrile-butadiene-styrene (ABS) copolymers have excellent physical properties, such as processability, rigidity, chemical resistance, and impact resistance, and an aesthetically pleasing appearance. In this case, processability, rigidity and chemical resistance, and impact resistance originate from styrene, acrylonitrile, and butadiene rubber, respectively. Because of these properties, ABS copolymers are widely used in various products, including automobile parts, electric/electronic products, and office automation (OA) supplies.

However, due to opacity thereof, ABS copolymers are difficult to use in manufacture of products requiring transparency, such as transparent windows attached to microwave ovens, vacuum cleaner ducts, TV housings, and transparent windows included in office equipment.

To overcome such disadvantages, methods of imparting transparency to ABS copolymers having excellent impact resistance, processability, and chemical resistance have been developed. For example, there is a method of introducing a methacrylic acid alkyl ester compound or an acrylic acid alkyl ester compound when preparing an ABS copolymer.

When conventional transparent ABS copolymers are prepared, a method of graft-copolymerizing an aromatic vinyl compound such as styrene, acrylonitrile, and a (meth)acrylic acid alkyl ester compound onto a rubber polymer, such as butadiene, using an emulsion polymerization method, is used to improve impact resistance. In this case, thermal stability of the copolymers may be deteriorated due to an emulsifier remaining in the latex after completion of polymerization, and discoloration may occur during thermoforming at high temperature or during long-term storage.

In addition, since an excess of water is used to remove impurities, such as an emulsifier, remaining in the copolymer latex prepared by emulsion polymerization, load may be increased during a dehydration or drying process, resulting in decrease in productivity.

Prior Art Document

[Patent Document](Patent Document 1) KR 10-0564816 B1
(Patent Document 2) KR 10-0769249 B1

DISCLOSURE

Technical Problem

Therefore, the present invention has been made in view of the above problems, and it is one object of the present invention to provide a graft copolymer and a method of preparing the same. According to the method of the present invention, as an emulsifier, a metal salt of sorbic acid, which can be easily removed in a dehydration or washing process, is included in a specific amount when emulsion graft polymerization is performed, and as a result, a graft copolymer having excellent thermal stability may be prepared.

It is another object of the present invention to provide a thermoplastic resin composition including the graft copolymer having excellent thermal stability and a molded part including the thermoplastic resin composition. According to the present invention, the thermoplastic resin composition and the molded part have excellent impact strength and fluidity, and at the same time, have improved transparency and high temperature-induced discoloration properties.

The above and other objects can be accomplished by the present disclosure described below.

Technical Solution

In accordance with one aspect of the present invention, provided is a graft copolymer including a conjugated diene rubber core; and a shell surrounding the rubber core, wherein the shell is obtained by graft-polymerizing a (meth)acrylic acid alkyl ester compound, an aromatic vinyl compound, and a vinyl cyanide compound, wherein, when the graft polymerization is performed, a metal salt of sorbic acid is added in an amount of 0.1 to 0.49 parts by weight based on 100 parts by weight of the total composition of the conjugated diene rubber core and the shell.

In accordance with another aspect of the present invention, provided is a method of preparing a graft copolymer, including a step of feeding 100 parts by weight of a monomer mixture containing 40 to 60 parts by weight of a conjugated diene rubber latex (based on solids), 25 to 50 parts by weight of a (meth)acrylic acid alkyl ester compound, 5 to 25 parts by weight of an aromatic vinyl compound, and 1 to 15 parts by weight of a vinyl cyanide compound; 0.1 to 3 parts by weight of an emulsifier; and 0.005 to 1 part by weight of an initiator into a reactor, and performing graft polymerization, wherein the emulsifier includes a metal salt of sorbic acid.

In accordance with another aspect of the present invention, provided is a thermoplastic resin composition including 10 to 60% by weight of the graft copolymer prepared according to the method of the present invention and 40 to 90% by weight of a (meth)acrylic acid alkyl ester compound-aromatic vinyl compound-vinyl cyanide compound copolymer.

In accordance with yet another aspect of the present invention, provided is a molded part manufactured by injection-molding the thermoplastic resin composition.

Advantageous Effects

As apparent from the foregoing, the present invention advantageously provides a graft copolymer having excellent thermal stability and a method of preparing the same. According to the present invention, when a graft copolymer is prepared through emulsion polymerization, a specific amount of a metal salt of sorbic acid is included in reactants for emulsion polymerization. Accordingly, the amount of residual emulsifier remaining in reaction products after completion of emulsion polymerization is reduced, and as a result, a graft copolymer having excellent thermal stability can be generated in a high yield. In addition, the present invention provides a thermoplastic resin composition including the graft copolymer of the present invention and a molded part including the thermoplastic resin composition. According to the present invention, the thermoplastic resin composition and the molded part have excellent physical properties, such as impact strength, fluidity, and transparency, and at the same time, have resistance to discoloration due to retention at high temperatures.

Best Mode

Hereinafter, the graft copolymer having excellent thermal stability and the method of preparing the same according to the present invention will be described in detail.

The present inventors confirmed that, when emulsion polymerization was performed to prepare a transparent ABS graft copolymer under conditions in which the amount of a conventional emulsifier used was reduced and a specific amount of a metal salt of sorbic acid was included in reactants, residual emulsifier was easily removed in a dehydration process, and thermal stability of a graft copolymer was improved. Based on these findings, the present inventors completed the present invention.

The graft copolymer of the present invention includes a conjugated diene rubber core; and a shell surrounding the rubber, wherein the shell is obtained by graft-polymerizing a (meth)acrylic acid alkyl ester compound, an aromatic vinyl compound, and a vinyl cyanide compound, wherein, when the graft polymerization is performed, a metal salt of sorbic acid is added, for example, in an amount of 0.1 to 0.49 parts by weight, 0.15 to 0.4 parts by weight, 0.18 to 0.35 parts by weight, 0.25 to 0.35 parts by weight, or 0.2 to 0.3 parts by weight based on 100 parts by weight of the total composition of the conjugated diene rubber core and the shell.

As another example, the graft copolymer of the present invention includes a conjugated diene rubber core; and a shell surrounding the rubber core, wherein the shell is obtained by graft-polymerizing a (meth)acrylic acid alkyl ester compound, an aromatic vinyl compound, and a vinyl cyanide compound, wherein, when the graft polymerization is performed, a metal salt of sorbic acid is added in an amount of 10 to 90% by weight, 20 to 80% by weight, 30 to 70% by weight, 40 to 60% by weight, or 45 to 65% by weight based on the total weight of an emulsifier used in the graft polymerization.

When the metal salt of sorbic acid is included in the above range, polymerization may proceed stably, and stability of the latex may be excellent. In addition, the emulsifier may be easily removed in dehydration and washing processes, and as a result, the amount of residual emulsifier may be reduced, so that the final resin composition and molded part may have excellent appearance, such as transparency. Furthermore, in the case of the resin composition and the molded part, the degree of discoloration that may occur upon exposure to high temperatures or during long-term storage may be greatly reduced.

For example, the metal salt of sorbic acid may be one or more selected from a potassium salt of sorbic acid and a sodium salt of sorbic acid, preferably a potassium salt of sorbic acid.

As a specific example, the graft copolymer of the present invention may be obtained by polymerizing 100 parts by weight of a monomer mixture containing 40 to 60 parts by weight or 45 to 55 parts by weight of the conjugated diene rubber core, 25 to 50 parts by weight or 30 to 40 parts by weight of the (meth)acrylic acid alkyl ester compound, 5 to parts by weight or 7 to 15 parts by weight of the aromatic vinyl compound, and 1 to 15 parts by weight or 1 to parts by weight of the vinyl cyanide compound under reaction conditions in which 0.1 to 0.49 parts by weight of the metal salt of sorbic acid are added. Within this range, the graft copolymer may have excellent impact resistance, such as impact strength, and resistance to discoloration due to retention at high temperatures. In addition, the transparency the graft copolymer may be improved.

The conjugated diene rubber core is a rubber polymer obtained by polymerizing a conjugated diene compound. For example, the conjugated diene compound may be one or more selected from 1,3-butadiene, isoprene, chloroprene, and piperylene.

As another example, the conjugated diene rubber core may be a rubber polymer obtained by polymerizing a conjugated diene compound and a comonomer copolymerizable therewith. For example, the comonomer may be one or more selected from an aromatic vinyl compound, a vinyl cyanide compound, and an olefin hydrocarbon.

As a specific example, the conjugated diene rubber core may be one or more selected from a butadiene polymer, a butadiene-styrene copolymer, a butadiene-acrylonitrile copolymer, and an ethylene-propylene copolymer, but is not limited thereto, preferably a butadiene polymer or a butadiene-styrene copolymer.

For example, the conjugated diene rubber core may have an average particle diameter of 2,000 to 4,000 Å, 2,500 to 3,500 Å, or 2,800 to 3,200 Å. Within this range, impact resistance, such as impact strength, may be excellent.

In the present invention, the average particle diameters of polymers, including the rubber core, may be measured, for example, using a dynamic light scattering technique Nicomp 380.

A shell surrounding the diene rubber core may include a copolymer obtained by polymerizing a (meth)acrylic acid alkyl ester compound, an aromatic vinyl compound, and a vinyl cyanide compound, and preferably has a weight average molecular weight of 80,000 to 300,000 g/mol or 100,000 to 150,000 g/mol.

When the weight average molecular weight of the shell is within this range, the mechanical strength, such as impact strength, of the copolymer may be excellent, and the melt flow index of the copolymer is appropriate, so that processing and molding may be easily performed.

In the present invention, the weight average molecular weight of the polymer may be measured by gel permeation chromatography (GPC) after the polymer is dissolved in an organic solvent, such as THF, and pretreated.

In the present invention, the (meth)acrylic acid alkyl ester compound may be a methacrylic acid alkyl ester compound, an acrylic acid alkyl ester compound, or a mixture thereof.

For example, the (meth)acrylic acid alkyl ester compound may include a linear alkyl group having 1 to 20 or 1 to 10 carbon atoms or a branched alkyl group having 3 to 20 or 3 to 10 carbon atoms.

As a specific example, the (meth)acrylic acid alkyl ester compound may be one or more selected from methacrylic acid alkyl ester compounds, such as methacrylic acid methyl ester (methyl methacrylate), methacrylic acid ethyl ester, methacrylic acid propyl ester, methacrylic acid 2-ethylhexyl ester, methacrylic acid decyl ester, and methacrylic acid lauryl ester; and acrylic acid alkyl ester compounds, such as acrylic acid methyl ester (methyl acrylate), acrylic acid ethyl ester, acrylic acid propyl ester, acrylic acid 2-ethylhexyl ester, acrylic acid decyl ester, and acrylic acid lauryl ester, preferably methacrylic acid methyl ester or acrylic acid methyl ester, more preferably methacrylic acid methyl ester.

For example, the aromatic vinyl compound may be one or more selected from styrene, alpha-methylstyrene, para-methylstyrene, and vinyltoluene, preferably styrene.

For example, the vinyl cyanide compound may be one or more selected from acrylonitrile, methacrylonitrile, and ethacrylonitrile, preferably acrylonitrile.

Hereinafter, the method of preparing a graft copolymer according to the present invention will be described in detail.

For example, the method of preparing a graft polymer includes a step of feeding 100 parts by weight of a monomer mixture containing 40 to 60 parts by weight or 45 to 55 parts by weight of a conjugated diene rubber latex (based on solids), 25 to 50 parts by weight or 30 to 40 parts by weight of a (meth)acrylic acid alkyl ester compound, 5 to 25 parts by weight or 7 to 15 parts by weight of an aromatic vinyl compound, and 1 to 15 parts by weight or 1 to 10 parts by weight of a vinyl cyanide compound; 0.1 to 3 parts by weight of an emulsifier; and 0.005 to 1 part by weight of an initiator into a reactor, and performing graft polymerization, wherein the emulsifier comprises a metal salt of sorbic acid.

Within this range, the final graft copolymer may have excellent impact resistance, such as impact strength, and have fluidity suitable for processing and molding. In addition, appearance characteristics, such as transparency, may be improved. Furthermore, thermal stability of the graft copolymer may be improved, so that the degree of discoloration that may occur when the graft copolymer is allowed to stand at high temperatures may be reduced.

The emulsifier for graft polymerization may include one or more compounds selected from metal salts of sorbic acid; and one or more compounds selected from the group consisting of sodium dodecyl allyl sulfosuccinate, alkenyl (C12-18) succinic acid dipotassium salts, rosin acid salts, fatty acid salts, alkyl (C12-20) sulfuric ester metal salts, sodium laureate, sodium oleate, potassium oleate, potassium stearate, sodium acrylamidostearate, and sodium 3-sulfopropyl tetradodecyl malrate. In this case, the amount of residual emulsifier may be reduced, so that thermal stability of the graft copolymer may be improved. Ultimately, the final resin composition and the molded part may have excellent physical properties, such as transparency, and have resistance to discoloration due to retention at high temperatures.

For example, the metal salt of sorbic acid is preferably contained in an amount of 10 to 90% by weight, 20 to 80% by weight, 30 to 70% by weight, 40 to 60% by weight, or 45 to 65% by weight based on the total weight of the emulsifier. Within this range, polymerization may proceed stably, and stability of the latex may be excellent. The content of solidified substances may be reduced, thereby improving productivity and quality.

As a specific example, the emulsifier is obtained preferably by mixing 10 to 90% by weight of the metal salt of sorbic acid and 10 to 90% by weight of alkenyl (C12-18) succinic acid dipotassium salt, more preferably by mixing 35 to 80% by weight of the metal salt of sorbic acid and 20 to 65% by weight of alkenyl (C12-18) succinic acid dipotassium salt, most preferably by mixing 55 to 75% by weight of the metal salt of sorbic acid and 25 to 45% by weight of alkenyl (C12-18) succinic acid dipotassium salt. In this case, polymerization may proceed stably, and stability of the latex may be excellent. In addition, thermal stability may be improved, and as a result, transparency, resistance to discoloration due to retention at high temperatures, and high-temperature storage stability may be greatly improved.

For example, the metal salt of sorbic acid may be one or more selected from potassium salts of sorbic acid and sodium salts of sorbic acid.

As another example, the metal salt of sorbic acid may be directly added to reactants, and then graft polymerization may be performed. Alternatively, after sorbic acid may be added in advance, sodium hydroxide or potassium hydroxide may be added thereto to form the metal salt of sorbic acid during graft polymerization. In terms of securing polymerization stability, the metal salt of sorbic acid is preferably directly added.

According to the graft copolymer preparation method of the present invention, a conjugated diene rubber latex is used as a seed. The conjugated diene rubber latex may be obtained through emulsion polymerization of the above-described conjugated diene compound.

In the present invention, when graft polymerization is performed, reactants may further include a molecular weight modifier or a redox initiator, and preferably both of them.

For example, the molecular weight modifier is preferably included in an amount of 0.1 to 1 part by weight or 0.3 to 0.7 parts by weight. Within this range, the amount of impurities remaining in the final graft copolymer latex may be reduced, and as a result, a copolymer having a required weight average molecular weight may be prepared without deteriorating thermal stability and transparency.

In the art to which the present invention pertains, compounds commonly used for the purpose of controlling the molecular weight of a polymer are not particularly limited, and may be used as the molecular weight modifier. Preferably, the molecular weight modifier may be one or more selected from the group consisting of mercaptan compounds, such as t-dodecyl mercaptan, n-dodecyl mercaptan, and n-octyl mercaptan, most preferably t-dodecyl mercaptan.

For example, the redox initiator may be included in an amount of 0.001 to 0.5 parts by weight, 0.05 to 0.2 parts by weight, or 0.05 to 0.1 parts by weight. Within this range, the activity of the initiator may be promoted, and thus polymerization efficiency may be improved.

For example, the redox initiator may be one or more selected from the group consisting of ferrous sulfide, dextrose, sodium pyrophosphate, sodium sulfite, sodium formaldehyde sulfoxylate, and ethylenediaminetetraacetic acid sodium, preferably a mixture of sodium formaldehyde sulfoxylate, ethylenediaminetetraacetic acid sodium, and ferrous sulfide.

In the present invention, when graft polymerization is performed, the (meth)acrylic acid alkyl ester compound, the aromatic vinyl compound, the vinyl cyanide compound, the initiator, and optionally the molecular weight modifier or the redox initiator are preferably continuously fed into a reactor. In this case, polymerization conversion rate and grafting degree may be increased, and a graft copolymer latex having a small amount of solidified substances may be prepared.

In the present invention, continuous feed is contrary to batch feed. According to continuous feed, materials to be supplied to a reaction may be continuously fed for a predetermined period of time, e.g., for 30 or more minutes, 60 or more minutes, or 90 or more minutes after start of the reaction to 3 or less hours or 2 or less hours before the end of the reaction, without a rest period, or may be fed dropwise.

In the present invention, graft polymerization may be, for example, completed within 4 to 7 hours at a reaction temperature of 40 to 90° C.

For example, the content of solidified substances contained in a graft copolymer latex generated after completion of the graft polymerization is preferably 0.4% by weight or less, 0.3% by weight or less, 0.35% by weight or less, or 0.25% by weight or less. Within this range, a high-quality graft copolymer may be generated in a high yield.

In the present invention, the content of solidified substances may be, for example, calculated according to Equation 1 below.

Content of solidified substances={Weight of solidified substances formed in reactor (g)/total weight of rubber and monomers (g)}×100   [Equation 1]

The graft copolymer latex generated after completion of graft polymerization may be prepared in a powder form through conventional solidification, washing, dehydration, and drying processes.

For example, the graft copolymer latex may be mixed with a coagulant, such as sulfuric acid, magnesium sulfate, calcium chloride, hydrochloric acid, or aluminium sulfate, and the mixture may be coagulated at 70 to 120° C. and atmospheric pressure, followed by washing, dehydration, and drying to obtain a graft copolymer in a powder form, without being limited thereto.

The graft copolymer of the present invention may be dispersed in a matrix resin and provided as a thermoplastic resin composition. Hereinafter, thermoplastic resin composition of the present invention will be described in detail.

For example, the thermoplastic resin composition of the present invention may include 10 to 60% by weight of the graft copolymer and 40 to 90% by weight of a (meth)acrylic acid alkyl ester compound-aromatic vinyl compound-vinyl cyanide compound copolymer as a matrix resin. Within this range, the final resin composition may have excellent transparency, and fluidity thereof may be appropriate, so that processing and molding may be facilitated.

As another example, the thermoplastic resin composition of the present invention may include 25 to 50% by weight of the graft copolymer and 50 to 75% by weight of a (meth)acrylic acid alkyl ester compound-aromatic vinyl compound-vinyl cyanide compound copolymer. Within this range, the resin composition may have excellent processability, moldability, and physical properties, such as transparency and impact resistance.

For example, the (meth)acrylic acid alkyl ester compound, the aromatic vinyl compound, and the vinyl cyanide compound, which are included in the (meth)acrylic acid alkyl ester compound-aromatic vinyl compound-vinyl cyanide compound copolymer, may be the same as the compounds included in the graft copolymer of the present invention.

As a specific example, the (meth)acrylic acid alkyl ester compound-aromatic vinyl compound-vinyl cyanide compound copolymer may be a methyl methacrylate-styrene-acrylonitrile (MSAN) copolymer, without being limited thereto.

For example, the (meth)acrylic acid alkyl ester compound-aromatic vinyl compound-vinyl cyanide compound copolymer may include 40 to 75% by weight of the (meth)acrylic acid alkyl ester compound, 15 to 40% by weight of the aromatic vinyl compound, and 3 to 20% by weight of the vinyl cyanide compound. Within this range, the final resin composition may have appropriate fluidity and excellent physical properties, such as impact resistance.

As another example, the (meth)acrylic acid alkyl ester compound-aromatic vinyl compound-vinyl cyanide compound copolymer may include 65 to 75% by weight of the (meth)acrylic acid alkyl ester compound, 20 to 30% by weight of the aromatic vinyl compound, and 5 to 15% by weight of the vinyl cyanide compound. Within this range, the final resin composition may have excellent processability, moldability, and physical properties, such as transparency and impact resistance.

For example, the (meth)acrylic acid alkyl ester compound-aromatic vinyl compound-vinyl cyanide compound copolymer may have a weight average molecular weight of 80,000 to 300,000 g/mol or 100,000 to 150,000 g/mol. Within this range, the final resin composition may have a melt flow index suitable for molding and processing, and have excellent transparency.

When necessary, the thermoplastic resin composition may optionally further include one or more additives selected from a stabilizer, a pigment, fuel, a reinforcing agent, an ultraviolet light absorber, an antioxidant, a coloring agent, a release agent, a lubricant, an antistatic agent, and a plasticizer.

For example, the additive is preferably included in an amount of 10 parts by weight or less or 1 to 5 parts by weight based on 100 parts by weight of a base resin including the graft copolymer and the (meth)acrylic acid alkyl ester compound-aromatic vinyl compound-vinyl cyanide compound copolymer.

In addition, the thermoplastic resin composition of the present invention may be obtained by mixing the (meth)acrylic acid alkyl ester compound-aromatic vinyl compound-vinyl cyanide compound copolymer, and a styrene-acrylonitrile copolymer or an alpha-methylstyrene-acrylonitrile copolymer as a matrix resin.

In addition, the thermoplastic resin composition of the present invention may be provided as an injection-molded part through an injection molding process.

For example, the thermoplastic resin composition of the present invention may be prepared in a pellet form through kneading and extruding, and then subjected to injection molding to prepare the molded part.

For example, the molded part of the present invention has a fluidity (220° C., load: 10 kg) of 10 to 20 g/10 min or 15 to 20 g/10 min as measured according to ASTM D1238. Accordingly, when the molded part is used, processing and molding may be easy.

For example, the molded part has an impact strength of 12.5 to 16 kgcm/cm or 14 to 16 kgcm/cm as measured according to ASTM D256. Thus, impact resistance of the molded part is excellent.

For example, the molded part has a haze value of 2.0 or less or 1.8 or less as measured according to ASTM 1003. Thus, transparency of the molded part is excellent.

When discoloration degree (ΔE) is measured under conditions wherein the molded part is allowed to stand in an injection molding machine at 250° C. for 15 minutes, the molded part has a discoloration degree (ΔE) of 3.0 or less, 2.8 or less, or 2.7 or less. Thus, thermal stability of the molded part is excellent.

In the present invention, using a color-difference meter (based on CIE Lab), L, a, and b values of a molded part are measured before the molded part is allowed to stand in an injection molding machine, and L', a', and b' values of a molded part having the same size with the above-described molded part are measured after the molded part is allowed to stand in an injection molding machine at 250° C. for 15 minutes, and discoloration degree (ΔE) can be calculated according to Equation 2.

$$\Delta E \sqrt{(L'-L)^2+(a'-a)^2+(b'-b)^2}$$ [Equation 2]

In describing the graft copolymer of the present invention, the method of preparing the graft copolymer, the thermoplastic resin composition including the graft copolymer, and the molded part including the thermoplastic resin composition, other conditions not specifically described are not particularly limited, and can be appropriately selected when they are within ranges normally practiced in the art to which the present invention pertains.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLE

Example 1: Preparation of Graft Copolymer 100 parts by weight of deionized water, 0.2 parts by weight of the dipotassium salt of alkenyl (C16-18) succinic acid and 0.3 parts by weight of the potassium salt of sorbic acid as an emulsifier were added to 50 parts by weight (based on solids) of a large-diameter conjugated diene rubber latex seed having an average particle diameter of 3,000 Å. Then, 35 parts by weight of methyl methacrylate, parts by weight of styrene, 3 parts by weight of acrylonitrile, 0.5 parts by weight of t-dodecyl mercaptan, 0.048 parts by weight of sodium formaldehyde sulfoxylate, 0.012 parts by weight of ethylenediaminetetraacetic acid sodium, 0.001 parts by weight of ferrous sulfide, and 0.04 parts by weight of cumene hydroperoxide were continuously fed at 75° C. for 5 hours, and reacted. Thereafter, temperature was raised to 80° C., and the reaction products were aged for 1 hour, and the reaction was terminated. In this case, polymerization conversion rate was 98.8%, and the amount of solidified substances was 0.24% by weight.

Example 2

Except that 0.25 parts by weight of the dipotassium salt of alkenyl (C16-18) succinic acid and 0.25 parts by weight of the potassium salt of sorbic acid as an emulsifier were fed, experiments were performed in the same manner as in Example 1.

Example 3

Except that 0.3 parts by weight of the dipotassium salt of alkenyl (C16-18) succinic acid and 0.2 parts by weight of the potassium salt of sorbic acid as an emulsifier were fed, experiments were performed in the same manner as in Example 1.

Example 4

Except that 0.2 parts by weight of the dipotassium salt of alkenyl (C16-18) succinic acid and 0.4 parts by weight of the potassium salt of sorbic acid as an emulsifier were fed, experiments were performed in the same manner as in Example 1.

Comparative Example 1

Except that 0.5 parts by weight of the dipotassium salt of alkenyl (C16-18) succinic acid were fed instead of 0.2 parts by weight of the dipotassium salt of alkenyl (C16-18) succinic acid and 0.3 parts by weight of the potassium salt of sorbic acid as an emulsifier, experiments were performed in the same manner as in Example 1.

Comparative Example 2

Except that 0.5 parts by weight of the potassium salt of sorbic acid were fed instead of 0.2 parts by weight of the dipotassium salt of alkenyl (C16-18) succinic acid and 0.3 parts by weight of the potassium salt of sorbic acid as an emulsifier, experiments were performed in the same manner as in Example 1.

Comparative Example 3

Except that 0.2 parts by weight of the dipotassium salt of alkenyl (C16-18) succinic acid and 0.09 parts by weight of the potassium salt of sorbic acid as an emulsifier were fed, experiments were performed in the same manner as in Example 1.

Usage Example

Usage Examples 1 to 7: Preparation of Thermoplastic Resin Composition 30 parts by weight of each of the graft copolymers prepared according to Examples 1 to 3 and Comparative Examples 1 and 3 were mixed with 70 parts by weight of a MSAN copolymer (LG Chem., XT500), 1 part by weight of a lubricant, and 0.2 parts by weight of an antioxidant using a mixer, and the mixture was extruded at 210° C. using a twin screw extruder to form pellets. The resin composition in the form of a pellet was subjected to injection molding at 210° C. to prepare specimens for measuring physical properties.

Test Example

Physical properties of the graft copolymer latexes prepared according to Examples and Comparative Examples and properties of the specimens prepared according to Usage Examples 1 to 7 were measured according to the following methods, and the results are shown in Table below.

Content of solidified substances (% by weight):

The content of solidified substances contained in the graft copolymer latex was calculated according to Equation 1 below.

using a color-difference meter (based on CIE Lab), and discoloration degree was calculated according to Equation 3 below.

$$\Delta E' = \sqrt{((L-L'')^2 + (a-a'')^2 + (b-b'')^2)}$$ [Equation 3]

TABLE 1

| Classification | Usage Example 1 Example 1 | Usage Example 2 Example 2 | Usage Example 3 Example 3 | Usage Example 4 Example 4 | Usage Example 5 Comparative Example 1 | Usage Example 6 Comparative Example 2 | Usage Example 7 Comparative Example 3 |
|---|---|---|---|---|---|---|---|
| Dipotassium salt of alkenyl succinic acid* | 0.2 | 0.25 | 0.3 | 0.2 | 0.5 | — | 0.2 |
| Potassium salt of sorbic acid* | 0.3 | 0.25 | 0.2 | 0.4 | — | 0.5 | 0.09 |
| Content of solidified substances [% by weight] | 0.24 | 0.23 | 0.22 | 0.23 | 0.21 | 0.9 | 0.45 |
| Transparency | 1.9 | 1.8 | 1.9 | 1.9 | 2.1 | 3.1 | 2.0 |
| Impact strength [kgcm/cm] | 14.8 | 15 | 14.8 | 14.7 | 14.5 | 12 | 14.1 |
| Fluidity [g/10 min] | 17.5 | 17.6 | 18 | 17.5 | 18.1 | 16 | 17 |
| Discoloration degree during injection molding (ΔE) | 2.7 | 2.8 | 2.8 | 2.7 | 3.6 | 3.2 | 2.6 |
| Long-term storage stability at high temperature (ΔE') | 0.43 | 0.46 | 0.47 | 0.43 | 0.8 | 0.7 | 0.41 |

(In Table 1, the numerical values shown in dipotassium salt of alkenyl succinic acid* and potassium salt of sorbic acid* represent the weight parts of each salt based on 100 parts by weight of the total composition of rubber and monomers fed when graft copolymers were prepared.)

Content of solidified substances={Weight of solidified substances formed in reactor (g)/total weight of rubber and monomers (g)}×100 [Equation 1]

Transparency (haze): Haze values of specimens were measured according to ASTM 1003. As a haze value decreases, transparency increases.

Impact strength (kgcm/cm): Impact strength of specimens prepared in ¼" thickness was measured according to ASTM D256.

Fluidity (g/10 min): Fluidity was measured for 10 minutes according to ASTM D1238 under the conditions wherein a load of 10 kg was applied at 220° C.

Degree of discoloration during injection molding (ΔE): using a color-difference meter (based on CIE Lab), L, a, and b values of a specimen were measured before the specimen was allowed to stand in an injection molding machine, and L', a', and b' values of a specimen having the same size with the above-described specimen were measured after the specimen was allowed to stand in an injection molding machine at 250° C. for 15 minutes, and discoloration degree (ΔE) can be calculated according to Equation 2 below.

$$\Delta E = \sqrt{(L'-L)^2 + (a'-a)^2 + (b'-b)^2}$$ [Equation 2]

Long-term storage stability at high temperature (ΔE'): Specimens were stored in an oven at 80° C. for 7 days, and then L", a", and b" values of the specimens were measured As shown in Table 1, in the case of Examples 1 to 4 according to the present invention, in which the amount of alkenyl succinic acid dipotassium salt, a conventional emulsifier, was reduced, and sorbic acid potassium salt was additionally added as an emulsifier, compared with Comparative Example 1 in which only conventional emulsifier was used, the contents of solidified substances contained in graft copolymers were similar. These results indicate that, when sorbic acid potassium salt is mixed within a specific range, stability of the graft copolymer remains high.

In addition, compared with Usage Examples 5 to 7 not according to the present invention, in the case of the thermoplastic resin compositions (Usage Examples 1 to 4) including the graft copolymer according to the present invention, impact strength was kept in high and transparency was excellent. Also, the thermoplastic resin compositions of Usage Examples 1 to 4 exhibited a melt flow index suitable for processing and molding, and had very excellent thermal stability.

In addition, when an excess of sorbic acid potassium salt was included (Comparative Example 2), the content of solidified substances was 0.9% by weight, which indicated that stability of the latex was markedly reduced. Thus, physical properties, such as transparency, impact strength, and thermal stability, of the final resin composition were remarkably deteriorated due to decrease in stability of the latex.

In addition, in the case of Comparative Example 3, in which a small amount of sorbic acid potassium salt was used as compared with Examples 1 to 4, although physical properties, such as transparency, impact strength, and thermal stability, were similar in comparison with Examples according to the present invention, the content of solidified substances was increased about twice. These results indicate that the method used in Comparative Example 3 is not preferable in terms of latex stability and resin productivity.

The invention claimed is:

1. A graft copolymer, comprising:
a conjugated diene rubber core; and a shell surrounding the rubber core,
wherein the shell is obtained by graft-polymerizing a (meth)acrylic acid alkyl ester compound, an aromatic vinyl compound, and a vinyl cyanide compound,
wherein, when the graft polymerization is performed, a metal salt of sorbic acid is added in an amount of 0.1 to 0.49 parts by weight based on 100 parts by weight of a total composition of the conjugated diene rubber core and the shell,
wherein the shell has a weight average molecular weight of 80,000 to 300,000 g/mol.

2. The graft copolymer according to claim 1, wherein the graft copolymer is obtained by polymerizing 100 parts by weight of a monomer mixture containing 40 to 60 parts by weight of the conjugated diene rubber core, 25 to 50 parts by weight of the (meth)acrylic acid alkyl ester compound, 5 to 25 parts by weight of the aromatic vinyl compound, and 1 to 15 parts by weight of the vinyl cyanide compound under reaction conditions in which 0.1 to 0.49 parts by weight of the metal salt of sorbic acid are added.

3. The graft copolymer according to claim 1, wherein the metal salt is one or more selected from a potassium salt and a sodium salt.

4. The graft copolymer according to claim 1, wherein the conjugated diene rubber core has an average particle diameter of 2,000 to 4,000 Å.

5. A method of preparing a graft copolymer, comprising:
a step of feeding 100 parts by weight of a monomer mixture containing 40 to 60 parts by weight of a conjugated diene rubber latex (based on solids), 25 to 50 parts by weight of a (meth)acrylic acid alkyl ester compound, 5 to 25 parts by weight of an aromatic vinyl compound, and 1 to 15 parts by weight of a vinyl cyanide compound; 0.1 to 3 parts by weight of an emulsifier; and 0.005 to 1 part by weight of an initiator into a reactor, and performing graft polymerization,
wherein the emulsifier comprises a metal salt of sorbic acid.

6. The method according to claim 5, wherein the metal salt of sorbic acid is contained in an amount of 10 to 90% by weight based on a total weight of the emulsifier.

7. The method according to claim 5, wherein the metal salt is one or more selected from a potassium salt and a sodium salt.

8. The method according to claim 5, wherein, when the graft polymerization is performed, the (meth)acrylic acid alkyl ester compound, the aromatic vinyl compound, the vinyl cyanide compound, and the initiator are continuously fed into the reactor.

9. The method according to claim 5, wherein, when the graft polymerization is performed, 0.1 to 1 part by weight of a molecular weight modifier, 0.001 to 0.5 parts by weight of a redox initiator, or both are used.

10. The method according to claim 5, wherein a content of solidified substances contained in a graft copolymer latex generated after completion of the graft polymerization is 0.4% by weight or less.

11. A thermoplastic resin composition comprising 10 to 60% by weight of the graft copolymer prepared according to the method of claim 6 and 40 to 90% by weight of a (meth)acrylic acid alkyl ester compound-aromatic vinyl compound-vinyl cyanide compound copolymer.

12. The thermoplastic resin composition according to claim 11, wherein the thermoplastic resin further comprises one or more additives selected from a stabilizer, a pigment, fuel, a reinforcing agent, an ultraviolet light absorber, an antioxidant, a coloring agent, a release agent, a lubricant, an antistatic agent, and a plasticizer.

13. A molded part, wherein the molded part is manufactured by injection-molding the thermoplastic resin composition according to claim 11.

14. The molded part according to claim 13, wherein the molded part has a fluidity (220° C., load: 10 kg) of 10 to 20 g/10 min as measured according to ASTM D1238.

15. The molded part according to claim 13, wherein the molded part has an impact strength of 12.5 to 16 kgcm/cm as measured according to ASTM D256.

16. The molded part according to claim 13, wherein the molded part has a haze value of 2.0 or less as measured according to ASTM 1003.

17. The molded part according to claim 13, wherein, when discoloration degree (ΔE) is measured under conditions wherein the molded part is allowed to stand at 250° C. for 15 minutes, the molded part has a discoloration degree (ΔE) of 3.0 or less.

* * * * *